United States Patent
Tsai et al.

(10) Patent No.: US 8,185,532 B2
(45) Date of Patent: May 22, 2012

(54) METHOD FOR FILTERING OUT IDENTICAL OR SIMILAR DOCUMENTS

(75) Inventors: Hong Yang Tsai, Taipei (TW); Hsun Hsueh Cho, Taipei (TW)

(73) Assignee: ESOBI Inc., George Town (KY)

( * ) Notice: Subject to any disclaimer, the term of this patent is extended or adjusted under 35 U.S.C. 154(b) by 298 days.

(21) Appl. No.: 12/561,843

(22) Filed: Sep. 17, 2009

(65) Prior Publication Data

US 2010/0082626 A1 Apr. 1, 2010

(30) Foreign Application Priority Data

Sep. 19, 2008 (TW) ................................ 97136089 A

(51) Int. Cl.
*G06F 7/00* (2006.01)
*G06F 17/30* (2006.01)
(52) U.S. Cl. ......... 707/737; 707/754; 707/758; 715/234
(58) Field of Classification Search .................. 707/602, 707/728, 749, 758, 737, 754; 715/234
See application file for complete search history.

(56) References Cited

U.S. PATENT DOCUMENTS

| | | | | |
|---|---|---|---|---|
| 5,717,913 A | * | 2/1998 | Driscoll | 707/999.005 |
| 6,128,635 A | * | 10/2000 | Ikeno | 715/246 |
| 7,649,478 B1 | * | 1/2010 | Yoon | 341/22 |
| 2004/0204861 A1 | * | 10/2004 | Benner | 702/19 |
| 2005/0149471 A1 | * | 7/2005 | Lassalle | 707/1 |
| 2008/0033913 A1 | * | 2/2008 | Winburn | 707/3 |
| 2008/0177994 A1 | * | 7/2008 | Mayer | 713/2 |
| 2008/0204282 A1 | * | 8/2008 | Jeon | 341/22 |
| 2009/0182734 A1 | * | 7/2009 | Wen et al. | 707/5 |

FOREIGN PATENT DOCUMENTS

CN 101093485 A 12/2007

* cited by examiner

*Primary Examiner* — Phong Nguyen
(74) *Attorney, Agent, or Firm* — Morris Manning & Martin LLP; Tim Tingkang Xia, Esq.

(57) ABSTRACT

A method for filtering out identical or similar documents includes storing multiple documents to be filtered as a pat tree (PT) data structure profile based on a pat tree data structure, searching for all string nodes with a consecutive character length reaching a lower threshold in the PT profile and all documents to which the string nodes belong, and finding documents having identical consecutive characters with a length reaching a higher threshold from the documents. Another technical solution includes searching for all string nodes with a consecutive character length reaching a lower threshold in the PT profile and all documents to which the string nodes belong, and finding documents having identical consecutive characters with such a length that a ratio of the length of the identical consecutive characters to a total character length of the original document reaches a ratio threshold from the documents, these documents are similarity.

8 Claims, 9 Drawing Sheets

METHOD FOR FILTERING OUT IDENTICAL OR SIMILAR DOCUMENTS

CROSS-REFERENCE TO RELATED APPLICATIONS

This non-provisional application claims priority under 35 U.S.C. §119(a) on Patent Application No(s). 097136089 filed in Taiwan, R.O.C. on Sep. 19, 2008, the entire contents of which are hereby incorporated by reference.

BACKGROUND OF THE INVENTION

1. Field of Invention

The present invention relates to a filtering method, and more particularly to a method for filtering out identical or similar documents from a plurality of documents and clustering the documents by using a computer.

2. Related Art

An Internet searching engine is a tool that helps a user to quickly search the vast Internet for data.

Generally speaking, the searching engine presents all results matching a searched keyword to the user, and presents all web pages without performing any filtering operation even if the web pages have identical contents. Although a few searching engines filter the search results, highly similar web pages still appear repeatedly.

Published PRC Patent No. CN101093485A has disclosed a "Method for filtering out repeated contents on web page", including a file server, a web page content extraction server, a web page filtering server, and a crawler server. The method includes: a) the crawler server fetches data from a web page and transmits the data to the web page content extraction server for analysis; b) the web page content extraction server extract contents and generates hash codes by using a hash algorithm, and then stores the hash codes, the contents, fetching time, and other information into the file server; and c) the web page filtering server analyzes the information in the file server, calculates the number of conflicts in each website where the hash codes obtained in the step b) conflict, and sets a threshold for the number of conflicts and the number of web pages in the website. If the number of conflicts in a website and the number of web pages in the website are higher than the threshold, the web page filtering server directly notifies the crawler server to prohibit the website and filters off all contents of the web page. If the number of conflicts in a website and the number of web pages in the website are lower than the threshold and the data is fetched at an early time, the importance of the web page is increased; otherwise, the importance of the web page is lowered or the web page is filtered off.

SUMMARY OF THE INVENTION

Accordingly, the present invention is a method for finding out documents with identical or highly similar contents from a plurality of documents and clustering the documents.

Another objective of the present invention is to display any one of identical or highly similar documents as a search result but not display other documents marked as identical or similar documents after finding out the identical or highly similar documents.

A preferred technical solution of the present invention comprises: converting data structures of a plurality of documents to be filtered, and storing the converted data structures together as a preset data structure profile; searching for all string nodes (node I) with a consecutive character length reaching a lower threshold in the data structure profile; recording a document identity (DID) stored in each of the found string nodes (node I) as a string group (G); checking whether all documents in the string group (G) have identical consecutive characters with a length reaching (that is, equal to or higher than) a higher threshold or not, and marking documents reaching the higher threshold as documents with identical or highly similar contents.

Another preferred technical solution of the present invention comprises: searching for all string nodes with a consecutive character length reaching a lower threshold in the data structure profile; recording a document identity (DID) stored in each of the string nodes (node I) selected from the data structure profile in the previous step as a string group (G); comparing all documents in the string group (G) in pairs to check whether all the documents have identical consecutive characters with such a length that a ratio of the length of the identical consecutive characters to a total character length of the original document reaches (that is, equal to or higher than) a ratio threshold or not, and marking documents reaching the ratio threshold as documents with identical or highly similar contents.

A further preferred technical solution of the present invention comprises: firstly, automatically abstracting contents of a plurality of documents to be filtered to generate abstract documents; and then, converting data structures of the representative abstract documents, and storing the converted data structures together as a preset data structure profile. Thereby, the time required for processing the documents to be filtered is shortened.

A still further preferred technical solution of the present invention comprises: processing synonyms in contents of the documents to be filtered or the abstract documents, such that synonyms in the contents have an identical character length. Thereby, the accuracy in filtering out identical or similar documents is improved.

Another preferred technical solution of the present invention further comprises: removing punctuation marks from contents of the documents to be filtered or the abstract documents.

BRIEF DESCRIPTION OF THE DRAWINGS

The present invention will become more fully understood from the detailed description given herein below for illustration only, and thus are not limitative of the present invention, and wherein:

FIG. 2-1 is an example of a pat tree data structure profile for Chinese type;

FIG. 2-2 is an example of a character tree data structure profile for Chinese type;

FIG. 3-1 is an example of a pat tree data structure profile for English separate word type;

FIG. 3-2 is an example of a character tree data structure profile for English character type;

DETAILED DESCRIPTION OF THE INVENTION

The method of the present invention disclosed below may be implemented by an ordinary electronic device, for example, a computer such as a personal computer, a note book computer, or a server computer. Persons skilled in the art should be able to understand and implement the method of the present invention.

Figure 1:
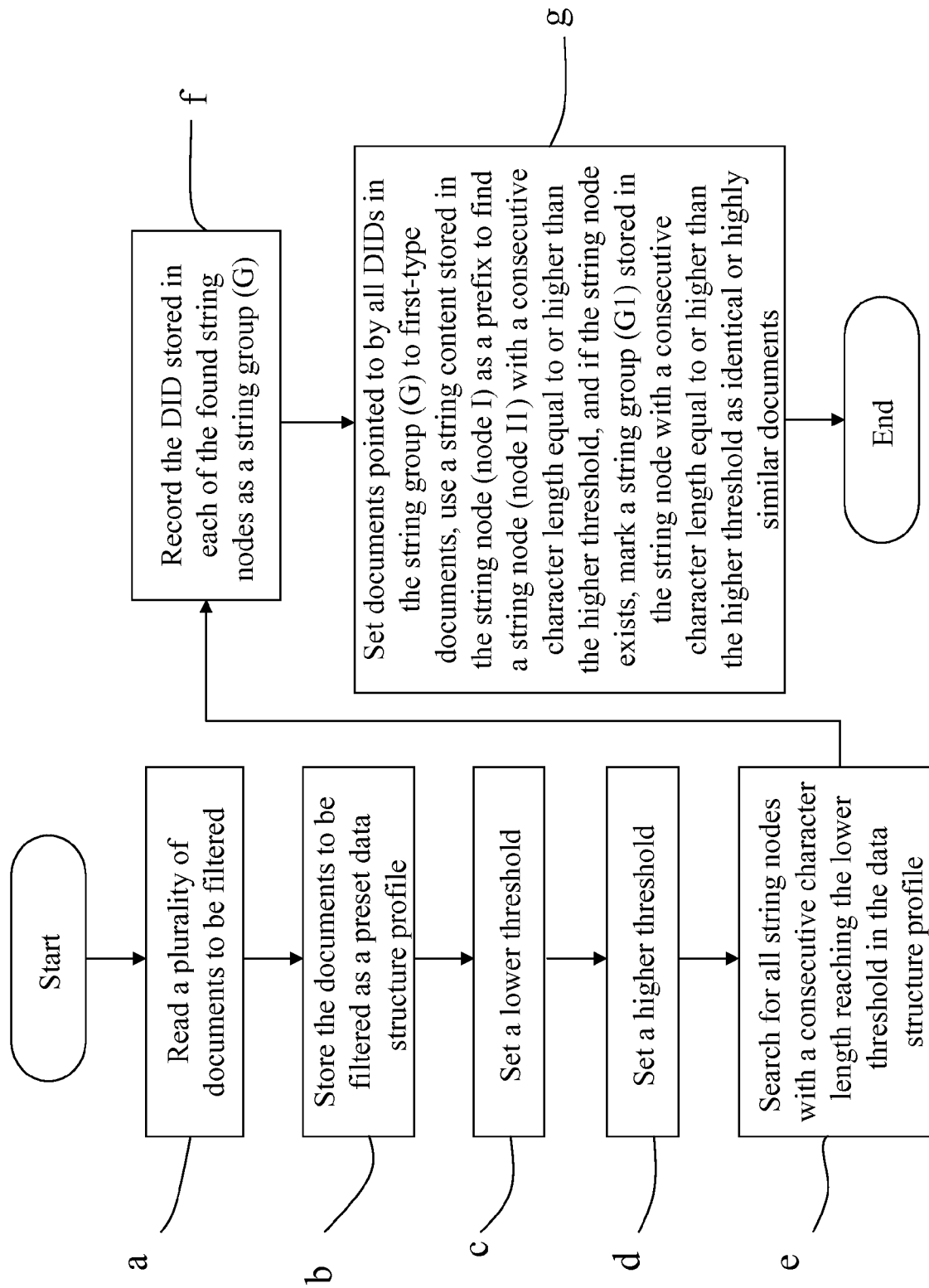
FIG. 1 is a flow chart of a preferred embodiment of the present invention.

According to a preferred embodiment, as shown in FIG. 1, the method of the present invention comprises:

(a) reading a plurality of documents to be filtered;

(b) converting data structures of the documents to be filtered, and storing the converted data structures together as a preset data structure profile;

(c) setting a lower threshold, representing a minimum consecutive character length;

(d) setting a higher threshold, representing a consecutive character length;

(e) searching for all string nodes (node I) with a consecutive character length reaching the lower threshold in the data structure profile, in which each of the string node stores a document identity (DID) of a document therein;

(f) recording the DID stored in each of the found string nodes (node I) as a string group (G); and (g) setting documents pointed to by all DIDs in the string group (G) to first-type documents, using a string content stored in the string node (node I) as a prefix to find a string node (node I1) with a consecutive character length equal to or higher than the higher threshold, and if the string node exists, marking a string group (G1) stored in the string node with a consecutive character length equal to or higher than the higher threshold as identical or highly similar documents.

The method may be applied to filter search results of a network searching engine to find out identical or highly similar documents (or web pages), and then display any one of the identical documents as a search result but not display other documents marked as identical or similar documents (or web pages).

The method of the present invention is suitable for filtering search results involving a large number of documents, and may also be applied to filter search results of a web page searching engine to filter out web pages with identical or highly similar contents, so as to solve the problem of repeated web page search results. The documents to be filtered may have different data structures, and may be, for example, documents recorded as a text file, a Hypertext Markup Language file (HTML file), an eXtensible HyperText Markup Language (XHTML) file, or documents of other data structures. Therefore, in a preferred embodiment, data structures of a plurality of documents to be filtered are converted, and stored together as a preset data structure profile. The data structure profile is preferably a pat tree data structure profile or a character tree data structure profile, which is described in detail below.

The present invention can apply to the different language of the string. The following embodiments utilizes to Chinese string and English string for description. Table 1 shows a pat tree data structure profile for Chinese type (briefly referred to as a PT profile below) generated based on a pat tree data structure. The pat tree is a binary tree (see FIG. 2-1). In the pat tree, each string node represents a binary string of binary codes (a binary string corresponding to the character string). In the pat tree, all string nodes have the same data format, and data recorded in each string node comprises: a binary string content, a check bit, and an DID of a document containing the binary string content. The check bit represents a bit from which the string node is different from a binary string of a substring node thereof. Chinese phrase "個人電腦"including four different characters in Table 1 means personal computer. However, each character has its own meaning "個"means individual. "人"means person or human being. "電"means electronic. "腦"means brain.

TABLE 1

| String Content/Node | String Bit | | |
|---|---|---|---|
| | 1 | 9 | 25  17 |
| 個人電腦/Node 0 (individual personal electronic brain) | 10101101 | 11010011 | 10100100 |
| 人電腦/Node 2 (personal electronic brain) | 10100100 | 01001000 | 10111001 |
| 電腦/Node 4 (electronic brain) | 10111001 | 01110001 | 00000000 |
| 腦/Node 6 (brain) | 10111000 | 01110001 | 00000000 |
| 人腦/Node 9 (electronic brain) | 10100100 | 01001000 | 00000000 |
| 腦/Node 6 (brain) | 10111000 | 00000000 | 00000000 |

Figures 1, 2:
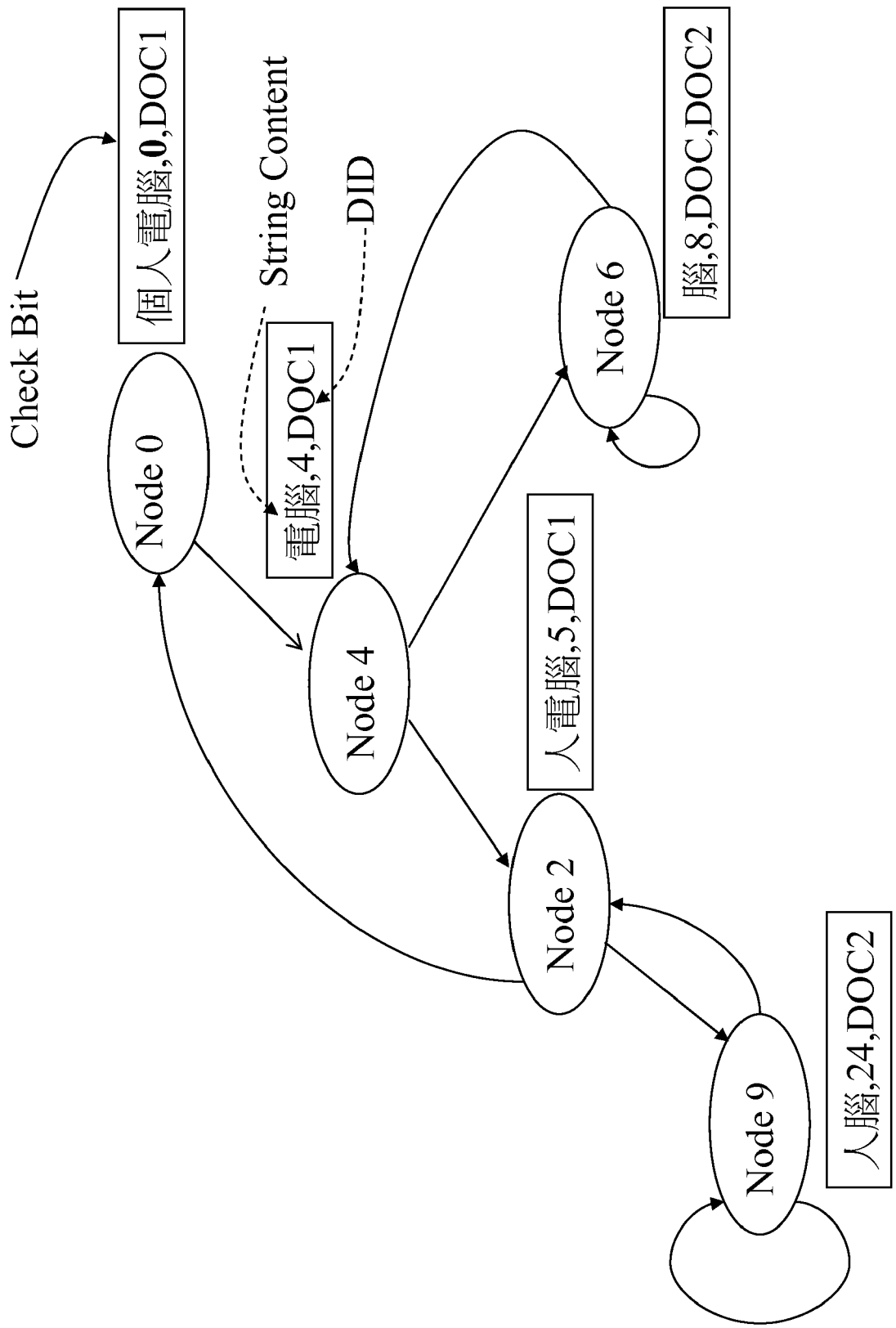
Figure 2:
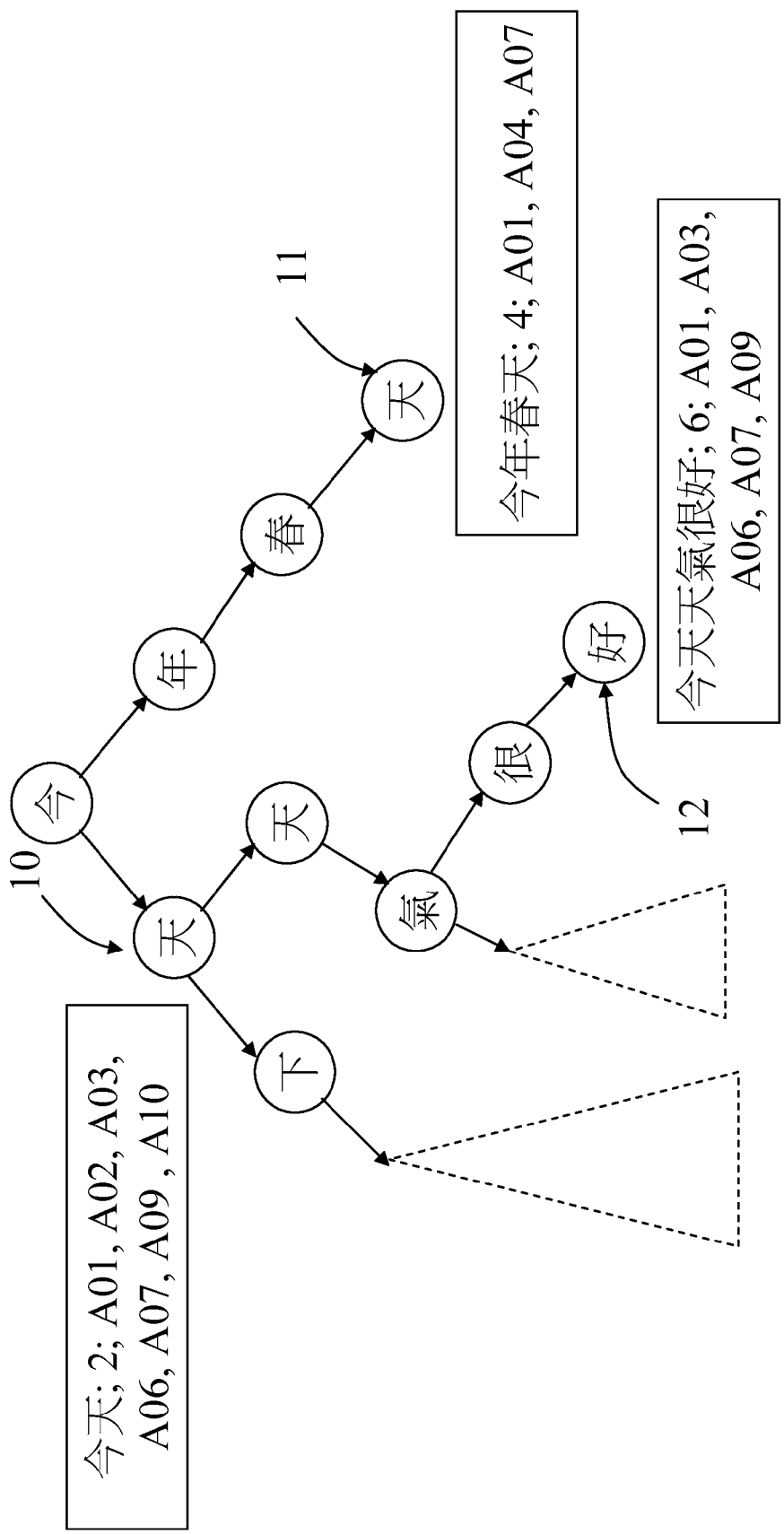

For example, String Node 6 in FIG. 2-1 records the following information:

(1) String Content: 10111000 00000000;

(2) Check Bit: 8; and (3) DID: DOC1, DOC2.

FIG. 2-2 shows an example of a character tree data structure profile for Chinese character type. In the character tree data structure profile, each string node represents a string of consecutive characters, all string nodes have the same data format, and data recorded in each string node comprises: a string content, a consecutive character length, and an DID of a document containing the string content. For example, in FIG. 2-1, String Node 11 records the following information:

(1) String Content: "今午春人";

(2) Consecutive Character Length: 4; and (3) DID: A01, A04, A07.

String Node 12 records the following information:

(1) String Content:"今天天氣很好";

(2) Consecutive Character Length: 6; and (3) DID: A01, A03, A06, A07, A09.

Table 2 shows a pat tree data structure profile for English separate word type (briefly referred to as a PT profile below) generated based on a pat tree data structure. The pat tree is a binary tree (see FIG. 3-1). In the pat tree, each string node represents a binary string of binary codes (a binary string corresponding to the character string). In the pat tree, all string nodes have the same data format, and data recorded in each string node comprises: a binary string content, a check bit, and an DID of a document containing the binary string content. The check bit represents a bit from which the string node is different from a binary string of a substring node thereof

TABLE 2

| String Content/Node | String Bit | | | |
|---|---|---|---|---|
| | 1 | 9 | 17 | 25 |
| 21st Deaflympics Taipei 2009/Node 0 | 00110010 00110001 | | 01110011 . . . | |
| Deaflympics Taipei 2009/Node 5 | 01000100 01100101 | | 01100001 . . . | |
| Taipei 2009/Node 17 | 01010100 01100001 | | 01101001 . . . | |
| 2009/Node 24 | 00110010 00110000 | | 00110000 . . . | |

TABLE 2-continued

| String Content/Node | String Bit | | | |
|---|---|---|---|---|
| | 1 | 9 | 17 | 25 |
| Deaflympics 2009/Node 30 | 01000100 01100101 | | 01100001 ... | |
| 2009/Node 24 | 00110010 00110000 | | 00110000 ... | |

Figures 1, 3:
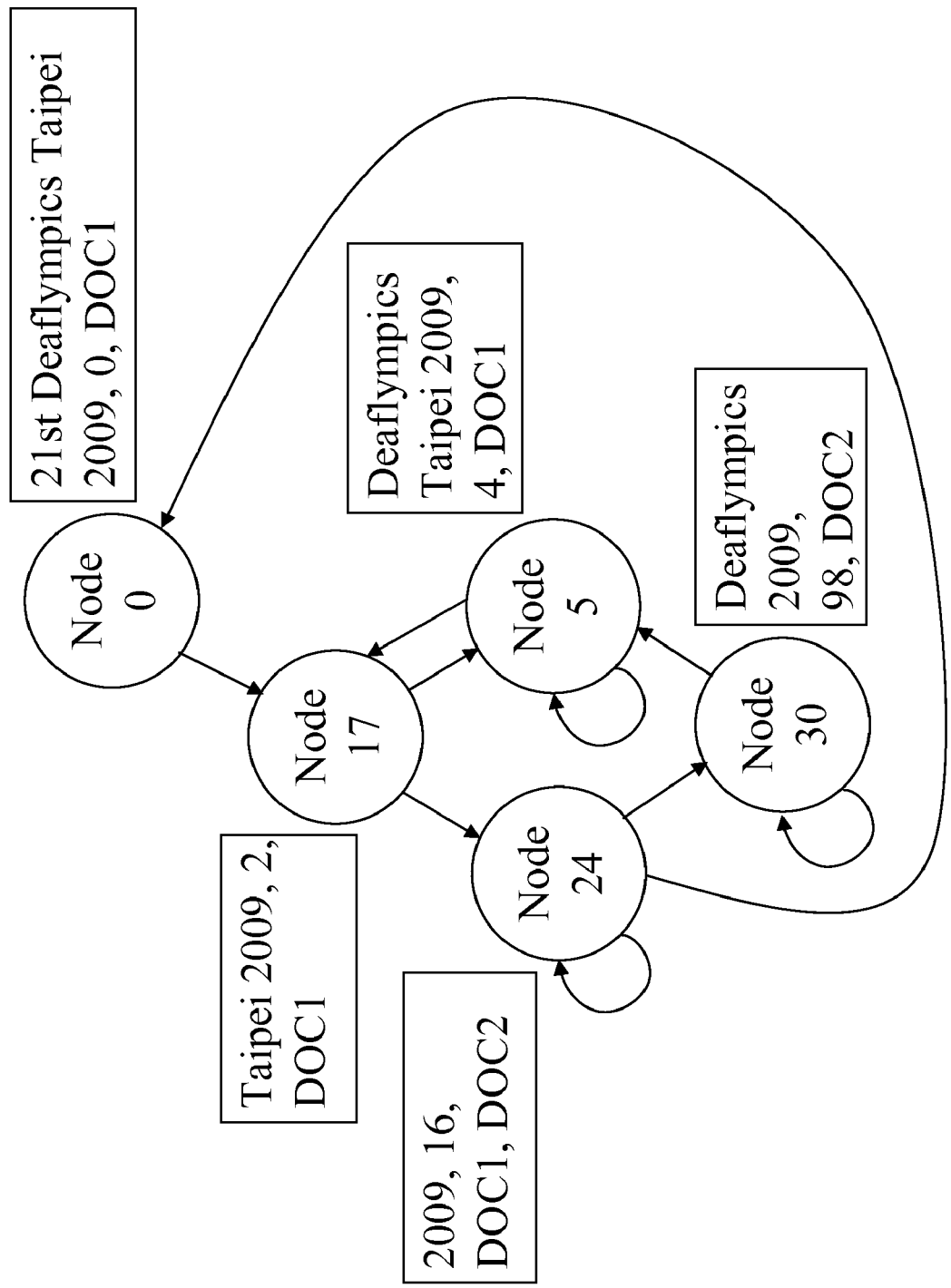
Figures 2, 3:
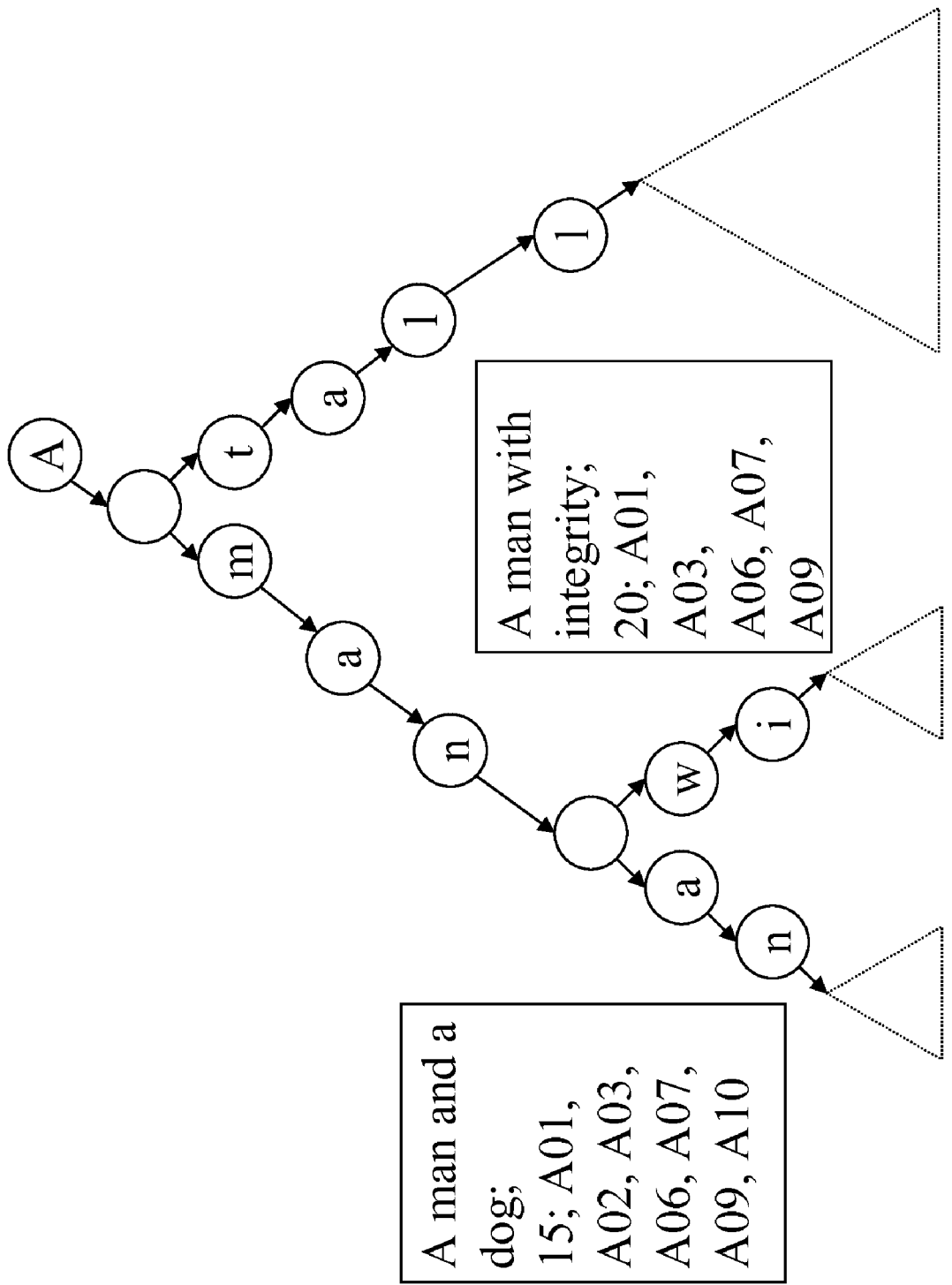

For example, String Node 24 in FIG. 3-2 records the following information:
- (1) String Content: 00110010 00110000;
- (2) Check Bit: 16; and
- (3) DID: DOC1, DOC2.

FIG. 3-2 shows an example of a character tree data structure profile for English character type. In the character tree data structure profile, each string node represents a string of consecutive characters, all string nodes have the same data format, and data recorded in each string node comprises: a string content, a consecutive character length, and an DID of a document containing the string content. For example, in FIG. 3-1, String Node 11 records the following information:
- (1) String Content: "A tall building";
- (2) Consecutive Character Length: 15; and
- (3) DID: A01, A04, A07.

String Node 12 records the following information:
- (1) String Content: "A man with integrity";
- (2) Consecutive Character Length: 20; and
- (3) DID: A01, A03, A06, A07, A09.

By taking the application of the method to filtering search results of a network searching engine as an example, when a plurality of web pages searched has identical sentences, the greater the consecutive character length of the identical sentences is, the more probable the web pages have identical or highly similar contents. On the other hand, the higher a ratio of the consecutive character length of the identical sentences to the total character length of the entire web page is, the more probable the web pages have identical or highly similar contents. Based on this, in the above preferred embodiments, a lower threshold and a high threshold are set, respectively. Firstly, documents having identical consecutive characters with a length reaching the lower threshold are found from the web pages, which can reduce the number of the web pages to be compared, thereby reducing the filtering time. Afterward, the documents are checked by using the higher threshold to find documents having identical consecutive characters with a length reaching the higher threshold from the documents, and the documents are marked as identical or highly similar documents.

Figure 4:
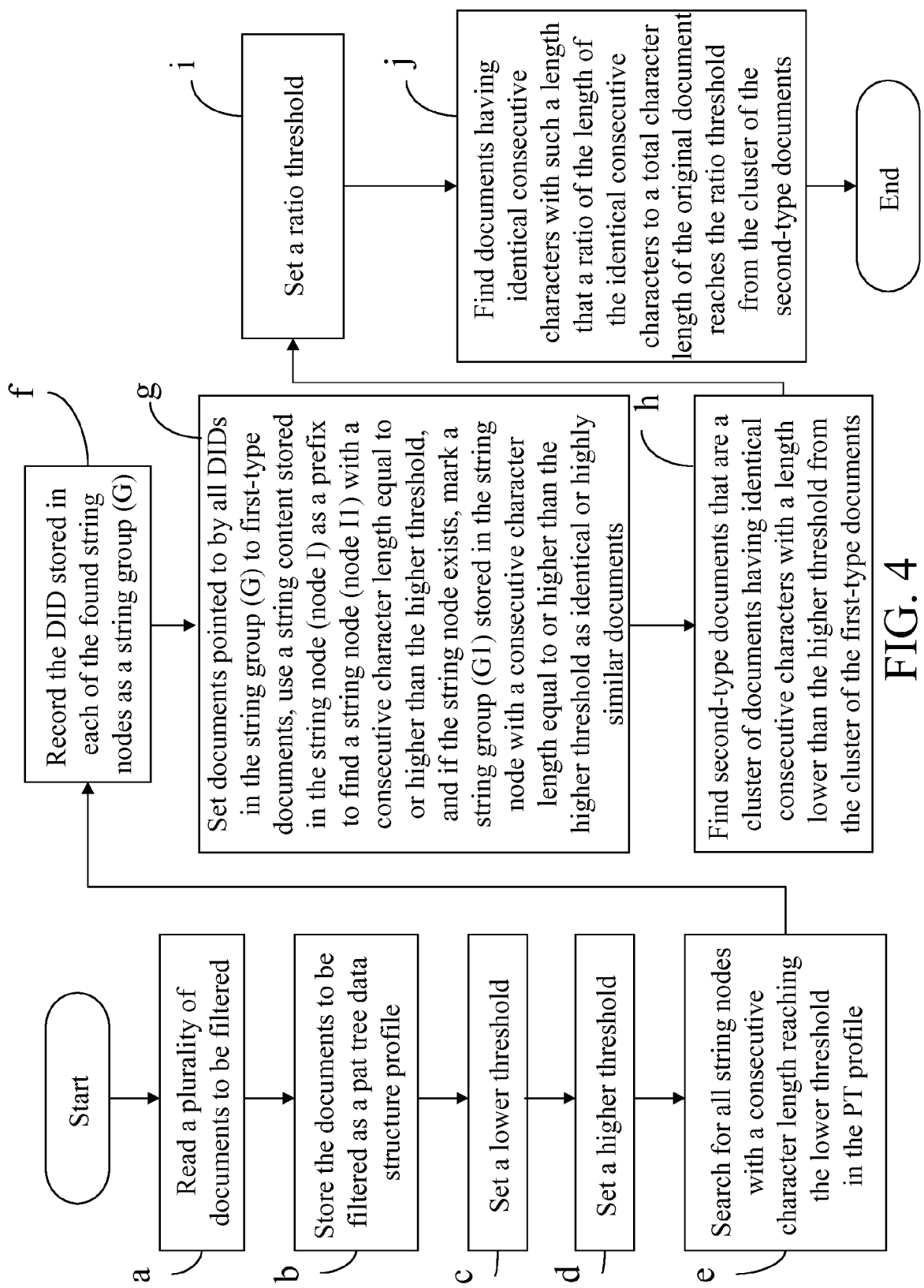
FIG. 4 is a flow chart of another preferred embodiment of the present invention.

In addition to the steps in FIG. 1, another preferred embodiment of the present invention disclosed in FIG. 4 further comprises:
- (h) finding second-type documents from the cluster of the first-type documents, in which the second-type documents are a cluster of documents having identical consecutive characters with a length lower than the higher threshold;
- (i) setting a ratio threshold; and
- (j) finding documents having identical consecutive characters with such a length that a ratio of the length of the identical consecutive characters to a total character length of the original document reaches the ratio threshold from the cluster of the second-type documents, and setting the found documents to documents with identical or highly similar contents.

For example, two documents A01 and A04 are provided. The total character length of the document A01 is 40, the total character length of the document A04 is 60, the length of identical consecutive characters between the documents A01 and A04 is 14, and the ratio threshold is set to $1/5$. Here, a ratio of the length of identical consecutive characters of the document A01 to the total character length of the original document A01 is $14/40$ ($>1/5$), and a ratio of the length of identical consecutive characters of the document A04 to the total character length of the original document is $14/60$ ($>1/5$). Therefore, according to the above preferred embodiments, the documents A01 and A04 are set to documents with identical or highly similar contents.

Figure 5:
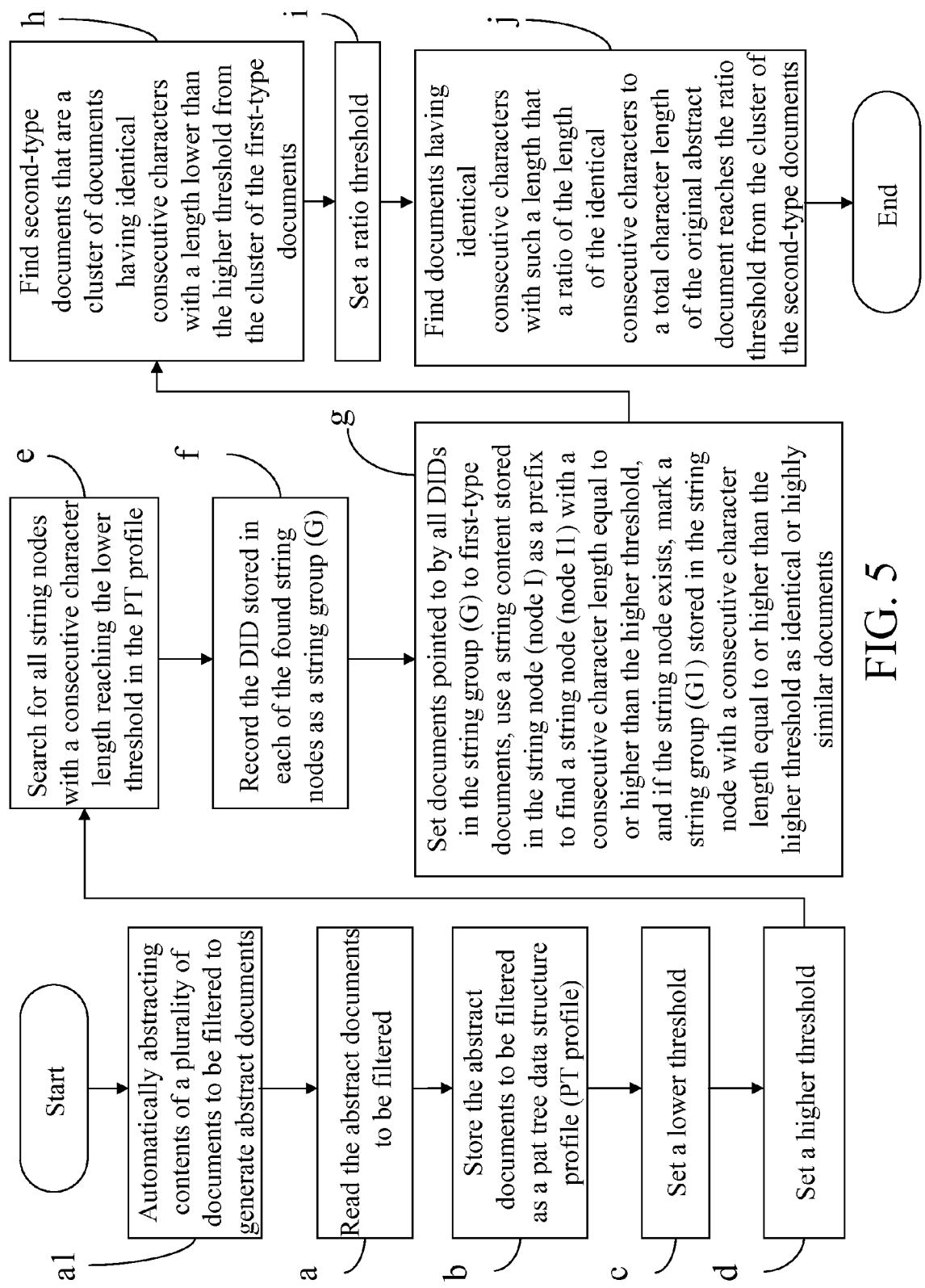
FIG. 5 is a flow chart of another preferred embodiment of the present invention.

FIG. 5 discloses another preferred embodiment of the present invention. Before the step (a) in FIG. 1, this embodiment further comprises: automatically abstracting contents of a plurality of documents to be filtered to generate abstract documents (step a1); and then, storing the representative abstract documents as a PT profile based on a pat tree data structure. Thereby, the time required for processing the documents to be filtered is shortened.

Figure 6:
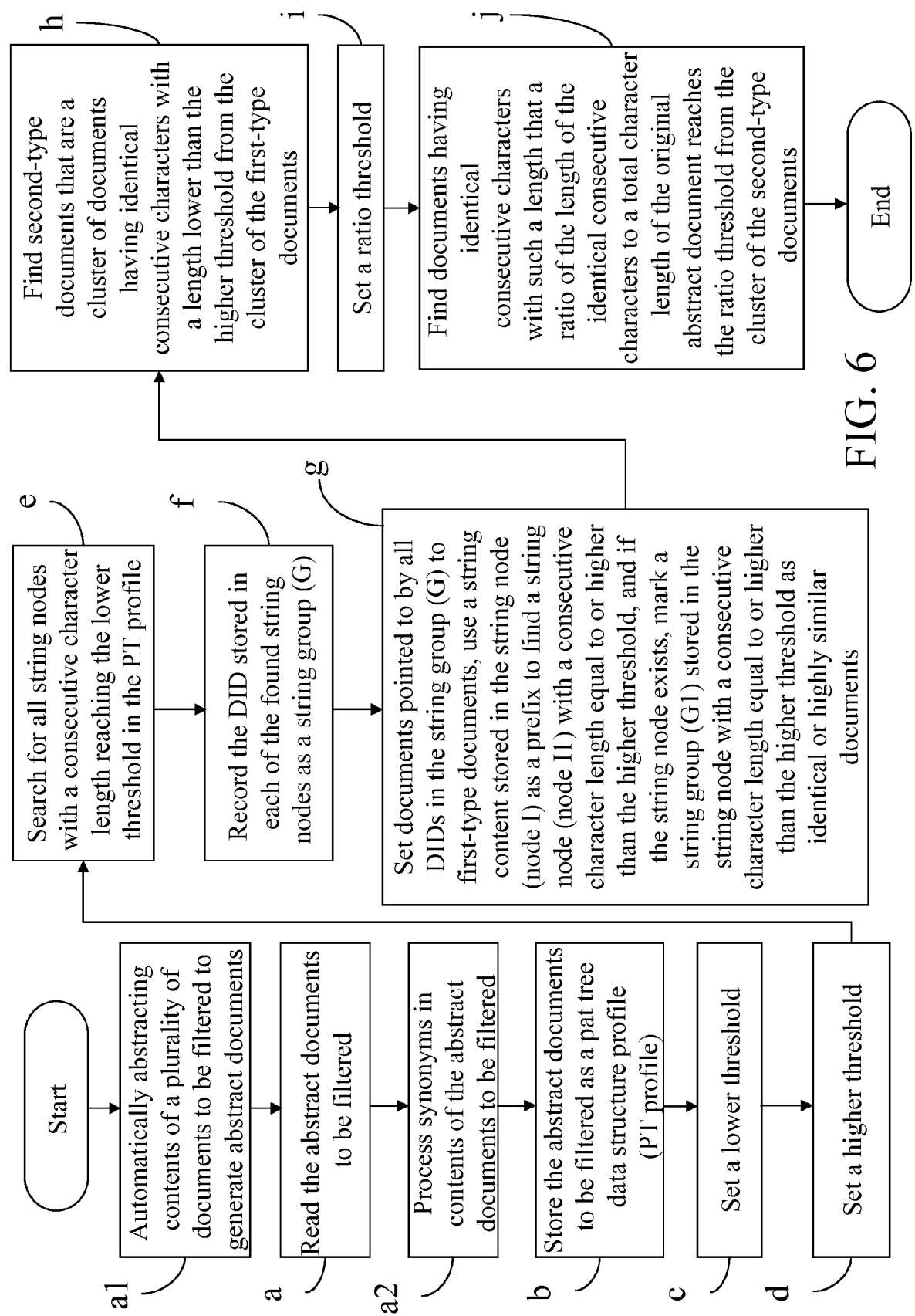
FIG. 6 is a flow chart of another preferred embodiment of the present invention.

Another preferred embodiment of the present invention further comprises: processing synonyms in the documents to be filtered or the abstract documents generated by automatically abstracting. An embodiment shown in FIG. 6 is illustrated by taking the abstract documents in FIG. 5 as an example. In this embodiment, in a step (a2), synonyms in contents of the abstract documents are processed, such that synonyms in the contents have an identical character length. Thereby, the accuracy in filtering out identical or similar documents is improved. For example, "计算机" in the documents to be filtered written in Simplified Chinese and "電腦" in the documents to be filtered written in Traditional Chinese are all modified to "電腦" written in Traditional Chinese, so as to avoid the problem that synonyms have different lengths.

Figure 7:
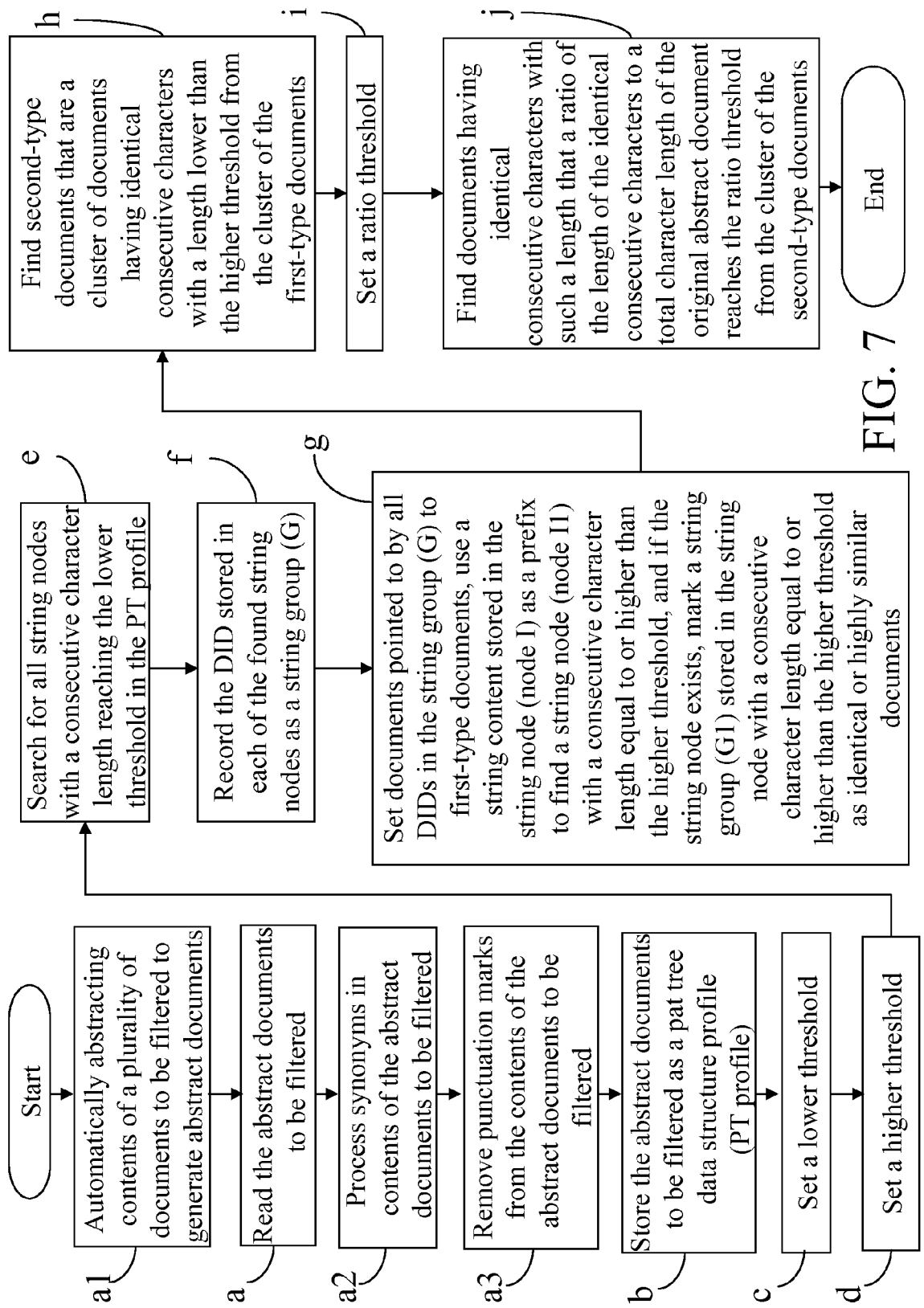
FIG. 7 is a flow chart of another preferred embodiment of the present invention.

Another preferred embodiment of the present invention further comprises: removing punctuation marks from the documents to be filtered or the abstract documents generated by automatically abstracting. An embodiment shown in FIG. 7 is illustrated by taking the abstract documents in FIG. 6 as an example. In this embodiment, in a step (a3), punctuation marks are removed from contents of the abstract documents to be filtered. Thereby, the accuracy of the processing result of the method of the present invention is improved, and the execution is also accelerated.

The steps (a2) and (a3) in the above preferred embodiments may also be used in any combination. After understanding the above description of the embodiments, persons skilled in the art should be able to completely understand variations thereof and implement the present invention.

What is claimed is:

1. A method for filtering out identical or similar documents, adapted to find out documents with identical or highly similar contents from a plurality of documents and cluster the documents by using an electronic device, the method comprising:
   - (a) reading a plurality of documents to be filtered;
   - (b) converting data structures of the documents to be filtered, and storing the converted data structures together as a preset data structure profile;
   - (c) setting a lower threshold, representing a minimum consecutive character length;
   - (d) setting a higher threshold, representing a consecutive character length;
   - (e) searching for all string nodes (node I) with a consecutive character length reaching the lower threshold in the data structure profile, wherein each of the string node stores a document identity (DID) of a document therein;

(f) recording the DID stored in each of the found string nodes (node I) as a string group (G);
(g) setting documents pointed to by all DIDs in the string group (G) to first-type documents, using a string content stored in the string node (node I) as a prefix to find a string node (node I1) with a consecutive character length equal to or higher than the higher threshold, and if the string node exists, marking a string group (G1) stored in the string node with a consecutive character length equal to or higher than the higher threshold as identical or highly similar documents;
(h) finding second-type documents from a cluster formed by the first-type documents, wherein the second-type documents are a cluster of documents with a consecutive character length lower than the higher threshold in the first-type documents;
(i) setting a ratio threshold; and
(j) finding documents having identical consecutive characters with such a length that a ratio of the length of the identical consecutive characters to a total character length of each document reaches the ratio threshold from the cluster of the second-type documents, and setting the found documents to documents with identical or highly similar contents.

2. The method for filtering out identical or similar documents according to claim 1, wherein before the step (a), the method further comprises automatically abstracting contents of the documents to be filtered to generate abstract documents.

3. The method for filtering out identical or similar documents according to claim 1, further comprising: processing synonyms in contents of the documents to be filtered.

4. The method for filtering out identical or similar documents according to claim 2, further comprising: processing synonyms in contents of the abstract documents.

5. The method for filtering out identical or similar documents according to claim 1, 2, 3, or 4, further comprising: removing punctuation marks from contents of the documents to be filtered.

6. The method for filtering out identical or similar documents according to claim 1, wherein after finding out identical or highly similar documents, the method further comprises displaying any one of the identical documents as a search result but not displaying other documents marked as identical or similar documents.

7. The method for filtering out identical or similar documents according to claim 1, wherein the document is selected from a group consisting of a web page, a text, a database, and data stored in other forms.

8. The method for filtering out identical or similar documents according to claim 1, wherein the data structure profile is a pat tree (PT) data structure or a character tree data structure.

* * * * *